United States Patent [19]

Rohrbach

[11] 4,342,554
[45] Aug. 3, 1982

[54] PRODUCTION OF EXPANDED CLAY AND SHALE

[75] Inventor: Hans-Joerg Rohrbach, Balingen, Fed. Rep. of Germany

[73] Assignee: Rohrbach Technologie KG Baustofftechnik GmbH & Co., Balingen, Fed. Rep. of Germany

[21] Appl. No.: 199,811

[22] Filed: Oct. 23, 1980

[30] Foreign Application Priority Data

May 6, 1980 [DE] Fed. Rep. of Germany ....... 3017288

[51] Int. Cl.³ .............................................. F27B 14/00
[52] U.S. Cl. ..................................... 432/13; 252/378; 432/105; 432/106
[58] Field of Search ................. 432/13, 103, 105, 106; 252/378, 378 P

[56] References Cited

U.S. PATENT DOCUMENTS

| | | | |
|---|---|---|---|
| 2,063,233 | 12/1936 | Debuch | 432/105 |
| 2,430,601 | 11/1947 | Cleary | 252/378 R |
| 2,621,160 | 12/1952 | Johnson et al. | 432/13 |
| 2,754,197 | 7/1956 | Wienert | 432/105 |
| 3,508,742 | 4/1970 | Minegishi | 432/13 |
| 3,751,220 | 8/1973 | Rossi | 432/105 |
| 4,082,499 | 4/1978 | Rossi | 432/105 |

Primary Examiner—John J. Camby
Attorney, Agent, or Firm—Spencer & Kaye

[57] ABSTRACT

In a process and apparatus for producing an expanded particulate product in a rotary tubular kiln presenting an essentially linear product conveying and treating region free of lateral offset, in which a burner at the discharge end of the kiln operates to introduce heat into the conveying and treating region, raw material is introduced into the conveying and treating region via the charging end and is conveyed through a preheating zone following the charging end in order to dry and heat that material, the material is then conveyed into an expansion zone following and preheating zone to produce the expanded product, and the expanded product is discharged via the discharge end, additional heat is supplied to the raw material by means of at least one additional burner, preferably a mantle burner, located in the conveying and treating region between the first-mentioned burner and the charging end.

9 Claims, 6 Drawing Figures

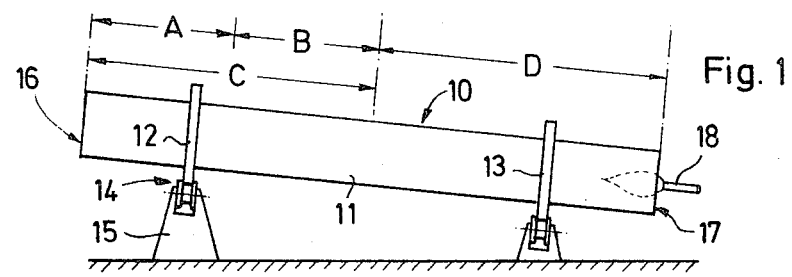
Fig. 1
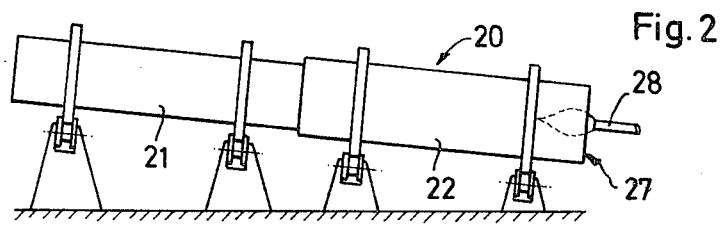
Fig. 2
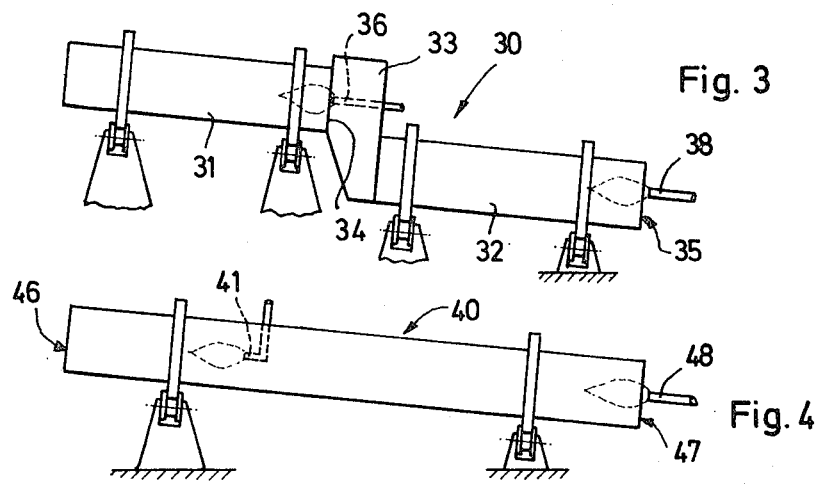
Fig. 3
Fig. 4
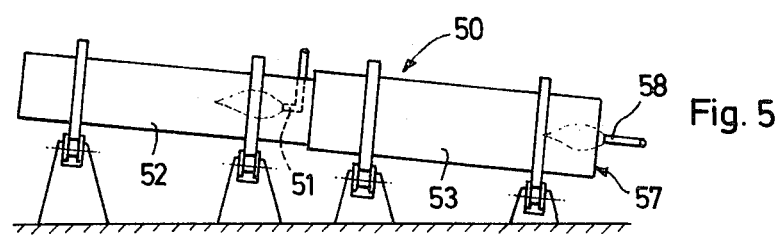
Fig. 5

PRODUCTION OF EXPANDED CLAY AND SHALE

BACKGROUND OF THE INVENTION

The present invention relates to a process for the production of expanded clay and shale in a rotary tubular kiln of the type which extends in a straight line without stages and has charging and discharge ends and a burner arranged in the proximity of the discharge end, wherein raw material introduced at the charging end passes through a preheating zone serving for the drying and heating up of the material and is thereupon expanded to the finished product in an expansion zone leading toward the discharge end by means of the heat generated by the burner.

The invention furthermore relates to devices for carrying out such a process in a rotary tubular kiln of the type described above.

In order to manufacture so-called lightweight concrete, use is made of lightweight aggregates which, as is known, particularly include expanded clay and shale, as well as, for example, sintered flue ash. The present invention concerns the production of such lightweight aggregates, primarily expanded clay and shale. Besides serving for the manufacture of lightweight concrete, these aggregates are used occasionally also for other purposes, for example in plant hydroponics, especially for indoor plants. Materials produced according to the present invention are also suitable for these uses.

The conventional processes and apparatus for the production of these lightweight aggregates utilize rotary tubular kilns which represent considerable construction and installation costs and which have an extraordinarily high heat consumption in their operation. The latter factor, in particular, represents an ever-increasing problem in view of the existing scarcity of fuels and the high fuel costs in the relevant industrial area.

SUMMARY OF THE INVENTION

It is, therefore, an object of the invention to reduce the construction costs, fuel consumption and energy requirement of a process and apparatus of the above-described type.

This and other objects are basically achieved according to the invention by additionally heating the raw material while it passes through the rotary tubular kiln, especially through the preheating zone, by means of one or several burners arranged at that location.

Thus, apparatus according to the invention is provided with mantle burners fixedly mounted at one or several locations of the rotary tubular kiln cylinder jacket, these burners rotating with the rotary tubular kiln and extending with their flame outlet orifices into the interior of the kiln.

BRIEF DESCRIPTION OF THE DRAWINGS

FIG. 1 is a pictorial elevational view of a first, conventional type of a rotary tubular kiln for the production of expanded clay or shale.

FIG. 2 is a view similar to that of FIG. 1 of a second, likewise conventional, type of a rotary tubular kiln for the production of expanded clay or shale.

FIG. 3 is a view similar to that of FIG. 1 of a third, conventional type of a rotary tubular kiln for the production of expanded clay or shale.

FIG. 4 is a view similar to that of FIG. 1 of the kiln of FIG. 1 modified according to a preferred embodiment of the invention.

FIG. 5 is a view similar to that of FIG. 2 of the kiln of FIG. 2 modified according to a preferred embodiment of the invention.

DESCRIPTION OF THE PREFERRED EMBODIMENTS

Figure 6:
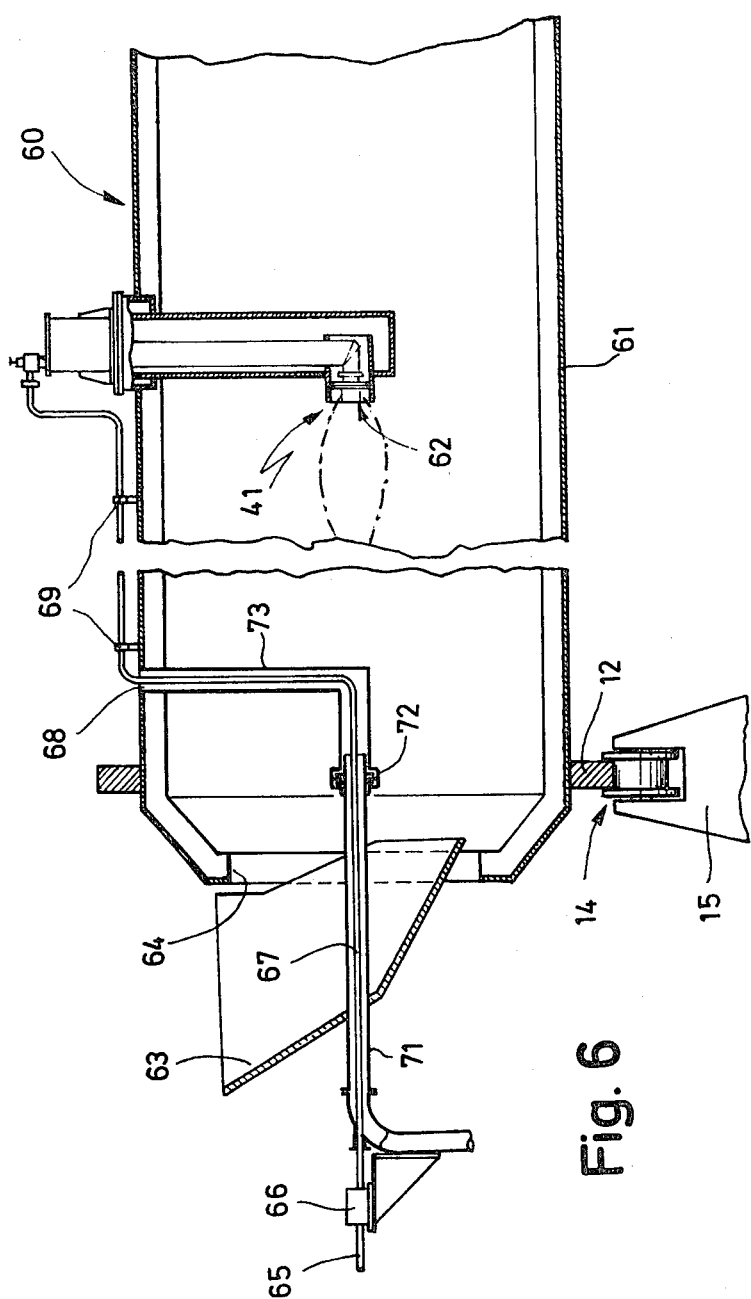
FIG. 6 is a cross-sectional detail view of the basic construction of a rotary tubular kiln with mantle burner according to the invention.

For a better understanding of the invention, conventional processes and apparatus for the production of expanded clay, expanded shale, sintered flue ash, or other lightweight aggregates will first be described.

FIG. 1 shows schematically a first type of rotary tubular kiln 10 composed of an elongated, rotatably mounted tube 11 having a length of, for example, 30–40 m, extending in the direction of its central axis linearly without any staggering. Two barrel rings 12 and 13 are fixedly arranged on the outside of the circularly cylindrical tube 11, these barrel rings being mounted to rotate about the axis of tube 11 on roller stations 14. The roller stations 14 each rest on a base support 15. A drive motor (not shown) serves for rotating tube 11 about its central axis.

The end of the tube 11 at the left-hand side in FIG. 1 is the charging end 16 into which raw material to be expanded is introduced. The finished product is removed at the discharge end 17 of the rotary tube 11, at the right-hand side of FIG. 1. The rotary tube 11 is inclined downwardly with respect to the horizontal in the direction from the charging end 16 to the discharge end 17, so that the product to be treated migrates gradually from the charging end 16 to the discharge end 17. At, or in the proximity of, the discharge end 17, a burner 18 fueled with oil, gas, or coal dust is fixedly mounted, the flame of this burner being oriented to project into the rotary tube 11 and supplying the heating energy required for treating the raw material in total.

In the production of expanded clay or another lightweight aggregate, the raw material, for example clay, is introduced at the charging end 16 into the revolving rotary tube 11. The raw material passes, countercurrently to the heating gases produced by the burner 18, in succession through a drying zone A and a heating zone B which are also called a preheating zone C in their entirety, and subsequently through an expansion zone D. The raw material dried and preheated in the preheating zone C is expanded in the expansion zone D to the desired finished product, e.g. expanded clay. The finished product is thereafter withdrawn via the discharge end 17.

The apparatus and the process taking place therein, as described thus far, are known per se.

Since the rotary tube 11 of the kiln 10 is made in one piece, it revolves at the same speed in the region of each processing zone, C and D. As a consequence, the traveling speed of the product within the kiln is the same in all zones. Accordingly, a control possibility in this type of kiln is restricted to a variation of the speed of the entire revolving tube, changing the firing output at the burner 18, and increasing or reducing the amount of raw material fed in at the charging end 16.

The second type of rotary tube kiln 20 illustrated in FIG. 2 differs from the first type of kiln according to FIG. 1 in that it consists of two rotary tubes 21 and 22 coaxially joined together in a sealing fashion and revolving independently of each other, wherein the rotary tube 21 contains essentially the preheating zone C and the rotary tube 22 contains essentially the expansion zone. Otherwise the kiln of FIG. 2 corresponds in construction and mode of operation to that of FIG. 1. In particular, in kiln 20 there is likewise merely a single burner 28 fixedly arranged at the discharge end 27.

The kiln of FIG. 2 has the advantage over that of FIG. 1 that, due to the subdivision of the kiln into two rotary tubes 21 and 22, the traveling speed of the product to be treated can be influenced differentially in partial sections of the kiln by varying the speed of each tube independently. The rotary tube 22 containing the expansion zone D is normally operated at a higher speed than the rotary tube 21 containing the drying and heating zones A and B.

The kilns shown in FIGS. 1 and 2 have the disadvantage that the entire heating energy for the drying, heating, and expansion processes must be provided at a single location, namely at the discharge end 17 of the kiln by means of a single flame.

Therefore, to eliminate this disadvantage, use has been made of a third type of rotary tube kiln 30, as illustrated in FIG. 3. In this kiln system, two rotary tubes 31 and 32, which again contain the preheating zone and the expansion zone, respectively, are arranged with their axes offset from one another to create a step in the displacement path which they define. A transition housing 33 is interposed between tubes 31 and 32 to transfer material therebetween. Sealing means are provided between the transition housing and the respective ends of the rotary tubes 31 and 32 at both end faces.

Each rotary tube 31 and 32 is fired at its discharge end 34 or 35, respectively, by a respective single burner 36 or 38. The transition housing 33, having a funnel shape at the bottom, furthermore provides for a smooth transition of the product to be treated from tube 31 into tube 32. The advantage of this version of a kiln resides in that the main heating energy for the entire roasting process needed during the drying and heating up of the raw material can be fed directly to the rotary tube 31 containing the preheating zone, where it is required. Thereby the expansion zone in the rotary tube 32 is substantially relieved regarding the amount of heat to be supplied. Since a high excess of air must be utilized in the expansion zone defined by rotary tube 32 during the manufacture of lightweight additives, especially in the production of expanded clay, the second firing produced by burner 36 in the preheating zone in rotary tube 31 makes it possible to use the high oxygen excess in the waste gases of the rotary tube 32 as secondary air, so that the waste gas heat losses from the expansion zone, on account of the lower specific waste gas quantity, based on the total amount of fuel as compared with the kiln types of FIGS. 1 and 2, lead to a lower heat consumption of the total installation. The kiln of FIG. 3, therefore, is especially economical from a heating energy viewpoint. The burner 38 can be operated, for example, with the air quantity halved and with half the amount of fuel oil as compared to the kilns of FIGS. 1 and 2.

The kiln of FIG. 3, though, also exhibits the following disadvantages: the rotary tube 31 containing the preheating zone extends to a relatively great height above ground and thus requires higher expenses for the foundation; and the two seals required between the rotary tubes 31 and 32 and the transition housing 33 are never perfect and not only allow the escape of heat but also permit entrance of leakage air, whereby the degree of efficiency of the installation can be considerably reduced.

Examples of industrial models of the above-described known rotary kilns include those sold under the trademark Liapor by Rohrbach Technologie Kommanditgesellschaft Baustofftechnik GmbH & Co., Balingen, FRG, and described in their prospectus "Lightweight Aggregate Process"; under the trademark LECA and described in the publication "FLS-newsfront" published by F. L. Smidth & Co., Copenhagen, Denmark (1973); and under the trademark DVS by Kennedy Van Saun, Danville, Pa., and described in the prospectus entitled "The specialists in pyroprocessing make your lightweight aggregate product worth much more."

A basic aspect of the invention resides in a practical application of the advantages of the kiln of FIG. 3, while avoiding its disadvantages.

This is accomplished as shown in FIG. 4 in principle by the combination of the one-piece kiln type of FIG. 1 with a so-called mantle burner 41 taking over the function of the fixed burner 36 in FIG. 3. Mantle burners are known per se from the metallurgical ore processing art. Such a burner is fixedly mounted on the outside of the furnace jacket, with its flame outlet orifice being located in the interior of the rotary tubular kiln, and revolves with the furnace jacket. Such a revolving mantle burner, as contrasted to the above-described, fixedly arranged burners 18, 28, 36, 38, thus has the advantage that it can be arranged at any desired location of a rotary tubular kiln which extends linearly without steps or offsetting.

FIG. 6 shows one preferred arrangement of such a mantle burner in a rotary tubular kiln. One end of the mantle burner 41 is connected fixedly to the jacket 61 of a rotary tubular kiln 60 and its other end extends radially into the interior of the kiln in such a way that its flame outlet orifice is located at the center of the kiln cross section and is aligned with the kiln axis. The kiln 60 proper has a charging end 64 equipped with a filling hopper 63 for raw material. It is also via this charging end that fuel, which may be oil, gas, or coal dust, is supplied to the mantle burner 41.

In the illustration of FIG. 6, it is assumed that the burner 41 is fed with oil. A fixed oil line 65 leads to a conventional rotary coupling 66 where a conduit section 67 rotating together with the rotary tubular kiln 60 adjoins the fixedly arranged line 65. The conduit section 67 extends past two elbows through an opening 68 in the jacket 61 to the outside of the kiln and there terminates at the burner 41. The conduit section 67 is supported, on the one hand, on the rotary coupling 66 and, on the other hand, by mounting members 69 on the jacket 61. In this way, fuel can be fed to the mantle burner 41 rotating with the kiln by way of the conduit section 67.

The conduit section 67 is surrounded in the interior of the rotary tubular kiln 60 by a pipe 71, 73 of a larger diameter which likewise contains a rotary coupling at 72. The pipe section 73 behind the rotary coupling 72 thus revolves with the rotary tubular kiln 60, while the section 71 ahead of the coupling is stationary. Cooling air to cool the line 67 can be blown in through the pipe section 71 and then through the pipe section 73. Furthermore, a concomitantly rotating primary air fan for the mantle burner 41 can also be arranged on the outside of the jacket 61 beside the mantle burner 41. This feature is not illustrated per se. Conduit section 67 passes through an opening provided in pipe section 71, which opening may be provided with a suitable packing.

The rotary tubular kiln 40 illustrated in FIG. 4, which is equipped with the simultaneously rotating mantle burner 41 directing a flame toward charging end 46, in addition to the burner 48 fixedly arranged at the discharge end 47, exhibits all advantages of the kiln type of FIG. 3, i.e. it has essentially a lower specific heat requirement. As compared to the kiln of FIG. 3, the two seals arranged at the transition housing 33 are eliminated, so that, in particular, no infiltrated air can enter the kiln any longer, leading to a further reduction in the specific heat requirement. A special advantage of the arrangement illustrated in FIG. 4 is the relatively low initial investment costs, since this kiln structure has merely a single kiln drive mechanism, and the number of barrel rings with roller stations and base supports can be reduced from four to two. However, as mentioned above, an adverse feature which must be tolerated in this type of kiln is that a separately controllable action on the preheating and expansion zones by respectively different rotary tube rotation speeds is impossible.

The last-mentioned disadvantage can be avoided, however, according to a further embodiment of the invention shown in FIG. 5, in the form of a kiln 50 similar to the kiln type shown in FIG. 2, but supplemented by a mantle burner 51 attached to the jacket of the rotary tube 52 containing the preheating zone and serving for heating this zone. The rotary tube 53 adjoining the rotary tube 52 and containing the expansion zone is heated at its discharge end 57 by a stationary burner 58.

The arrangement shown in FIG. 5 has again the advantage of lower initial construction costs as compared with the kiln type of FIG. 3, because the lower structural height of the rotary tube 52 results in lower costs for the foundation. In addition, one of the kiln seals required at the transition housing 33 of FIG. 3 is eliminated, since the tubes 52 and 53, adjoining each other coaxially and without being laterally offset, require only a single seal at their junction. Moreover, the kiln arrangement according to FIG. 5 has the significant advantage over the kiln type of FIG. 2 of a low specific heat requirement.

In the embodiments illustrated in FIGS. 4 and 5, respectively, one single, additional mantle burner 41 or 51, respectively, is provided which, in total, serves for heating up the preheating zone. According to other embodiments of the invention, it is also possible to provide two or more mantle burners on one or on both rotary tubes of the kiln installation, for example, one respective mantle burner for each of the drying and heating zones making up the preheating zone.

One main advantage of the invention furthermore resides in that also in already existing kiln installations, for example those according to FIGS. 1 and 2, a mantle burner can be field installed at the desired location of the kiln jacket. Thereby such an installation can be converted subsequently in such a way that considerable savings in fuel can be attained in operation as compared to the original condition. In a practical design of a rotary kiln 30 (FIG. 3) the two burners 36 and 38 consume a total of approximately 1050 kg of heavy fuel oil per hour, the quantity of oil being equally distributed between the two burners 36 and 38. The same figures apply in practice for preferred designs of rotary kilns 40, 50 (FIG. 4 or 5) and their burners 41, 48 or 51, 58.

A rotary kiln 40 (FIG. 4) may in practice, for example, be approximately 54 m long and between 3 and 4 m in diameter and may rotate at a speed of 3-5 revolutions per minute. The raw material fed into a kiln such as this may have, for example, the following composition (in % by weight):

| | |
|---|---|
| $SiO_2$ | 55-65% |
| $Al_2O_3$ | 15-25% |
| $Fe_2O_3$ | 7-15% |
| $CaO + MgO$ | 7% max. |
| S | 0.5% max. |
| $SO_3$ | 0.7% max. |

Approximately 26 metric tons of this raw material are fed into the intake end 46 of the kiln 40 per hour. The processing time of the material as it passes through the kiln 40 is approximately 40 min.

In this example, the first burner 41 is located approximately 32 m from the intake end 46. The material is heated up to approximately 900° C. by the first burner 41 and then further to approximately 1250° C. by the second burner.

It will be understood that the above description of the present invention is susceptible to various modifications, changes and adaptations, and the same are intended to be comprehended within the meaning and range of equivalents of the appended claims.

What is claimed is:

1. In a process for producing expanded clay or shale aggregate material in a rotary tubular kiln presenting an essentially linear product conveying and treating region free of lateral offset, the kiln including a raw material charging end and expanded material discharge end at respectively opposite ends of the conveying and treating region and being provided with a burner located in the vicinity of the discharge end for heating the conveying and treating region with the conveying and treating region being composed of a preheating zone and an expansion zone following one another in the direction from the charging end to the discharge end, the preheating zone being more proximate to the charging end and the expansion zone being more proximate to the discharge end, which process is carried out by operating the burner to introduce heat into the conveying and treating region while introducing raw material into the conveying and treating region via the charging end, and conveying the material through the preheating zone in order to dry and heat that material and then conveying the material into the expansion zone to produce the expanded material, with the heat produced by the burner acting to cause essentially all expansion of the material to occur in the expansion zone, and then discharging the expanded material via the discharge end, the improvement comprising providing at least one additional burner having a flame outlet orifice, mounting the additional burner on the kiln to rotate therewith in a position such that the flame outlet orifice is located within the kiln between the expansion zone and the material charging end and is oriented to direct a heating flame toward the material charging end, and supplying additional heat to the raw material in the preheating zone by operating the at least one additional burner to produce the heating flame.

2. A process as defined in claim 1 wherein said step of supplying additional heat is carried out by positioning the additional burner outlet orifice to produce a flame which is located at the center of the kiln cross section and is aligned with the kiln axis.

3. A process as defined in claim 1 or 2 wherein the additional burner is a mantle burner.

4. A process as defined in claim 1 or 2 wherein said steps of operating the burner, conveying the material and supplying additional heat are carried out continuously during performance of said process.

5. In a rotary tubular kiln for producing expanded clay or shale aggregate material, which kiln includes means defining an essentially linear product conveying and treating region free of lateral offset and composed of a cylindrical jacket enclosing the region and mounted for rotation about an axis parallel to its longitudinal axis, the kiln having a raw material charging end and an expanded product discharge end at respectively opposite ends of the conveying and treating region the conveying and treating region being composed of a preheating zone and an expansion zone following one another in the direction from the charging end to the discharge end, the preheating zone being more proximate to the charging end and the expansion zone being more proximate to the discharge end, and a first burner located in the vicinity of the discharge end for heating the conveying and treating region to an extent to cause essentially all expansion of the material to occur in the expansion zone, the improvement comprising at least one mantle burner fixed to said jacket to rotate therewith and having a flame outlet orifice located between said expansion zone and charging end to direct a heating flame into said preheating zone.

6. An arrangement as defined in claim 5 wherein: said kiln is composed of first and second cylindrical jackets mounted coaxially to one another for rotation independently of one another, each about an axis parallel to its longitudinal axis, said jackets being disposed axially adjacent one another with said first jacket extending from said charging end and said second jacket extending to said discharge end; said preheating zone is coextensive with said first jacket and said expansion zone is coextensive with said second jacket; and said mantle burner is fixed to said first jacket.

7. An arrangement as defined in claim 6 wherein said flame outlet orifice of said mantle burner is disposed substantially between said preheating and expansion zones.

8. An arrangement as defined in claim 5 wherein said preheating zone is located between said charging end and an intermediate location between said charging and discharge ends, said expansion zone is located between said intermediate location and said discharge end, and said flame outlet orifice of said mantle burner is disposed substantially at said intermediate location.

9. An arrangement as defined in claim 2 wherein said cylindrical jacket is a unitary member extending from said charging end to said discharge end and coextensive with both of said zones, and said mantle burner is disposed for heating said preheating zone.

* * * * *